United States Patent Office 3,074,988
Patented Jan. 22, 1963

3,074,988
POLYESTERS
Paul M. Kerschner, Trenton, N.J., and Bertrand W. Greenwald, Portland, Conn., assignors to Cities Service Research and Development Company, New York, N.Y., a corporation of New Jersey
No Drawing. Filed Jan. 11, 1961, Ser. No. 81,958
18 Claims. (Cl. 260—448.2)

This invention relates to dibasic acid esters and more particularly to carbon functional organo-siloxane dibasic acid halogen containing polyesters.

This application is a continuation-in-part of applications Serial Nos. 814,370 and 814,676 both now abandoned.

In its broadest aspect, this invention relates to new compounds prepared by reacting a carbon functional organo-siloxane dicarboxylic acid with an aliphatic diol, followed by the addition and further reaction of a stoichiometric amount or small excess of a monohydric alcohol which acts as a chain terminator for the ester produced. These new compounds prepared according to the foregoing reaction possess properties and characteristics making them particularly suitable for use as synthetic lubricants and hydraulic fluids. These new compounds possess high viscosity indices, high specific gravity, low pour point and high flash point. These products are relatively stable to oxidation and high temperature making them suitable for use in high temperature engines such as turboprop and jet airplane engines.

The new compounds of the present invention are made possible by utilizing carbon functional organo-siloxane acids as distinguished from previously prepared silicon containing structures which are not prepared from such acids. The importance of the utilization of carbon functional organo-siloxane acids will be apparent when consideration is given to the unstable nature of the so-called silicate bonding which exists in structures in which the carboxyl group is attached to a silicon atom through an oxygen atom. This bond is prone to hydrolysis in the presence of water. In the carbon functional organo-siloxane acid, however, the acid group is directly attached to a carbon atom and therefore is not subject to hydrolysis. Since water often exists in those areas in which lubricants are used, the importance of employing compounds having stable linkages is readily apparent for this use.

The new compounds of the present invention correspond to the general formula:

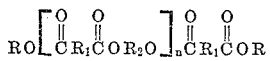

wherein R is a monovalent radical selected from the group consisting of hydrocarbon, fluorinated, chlorinated and fluorochlorinated radicals of from 2 to 12 carbon atoms; $R_1$ is the radical

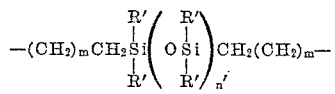

wherein R' and R" are hydrocarbon radicals of from 1 to 10 carbon atoms and $n'$ is an integer from 1 to 8; the R' and R" radicals may be of like or unlike structure; $R_2$ is an organic divalent radical selected from the group consisting of hydrocarbon, chlorinated, fluorinated, fluorochlorinated and ether radicals of from 2 to 12 carbon atoms; and $n$ is an integer from 1 to 4; and $m$ is an integer from 1 to 8. For the purposes of this invention, the terms "fluorinated," "chlorinated" and "fluorochlorinated" refer both to those radicals which are completely saturated with the respective halogen and those radicals which are only partially substituted.

In the foregoing general structure the divalent group represented by $R_1$ is the residue of a carbon functional organosiloxane dicarboxylic acid. These acids are known to those skilled in the art and may be prepared by subjecting a chlorinated alkyl disiloxane to a malonic ester synthesis. The product of this synthesis is hydrolyzed and decarboxylated. A more complete description of these acids and the manner in which they may be prepared is found in JACS 78, 2010 (1956). The siloxane groupings in the acid nucleus may be increased in number by treating the resultant esters with concentrated sulphuric acid in the presence of octamethylcyclotetrasiloxane. This method of expanding the siloxane center of the dibasic acid is described in JACS 75, 6336 (1953). The R' and R" substituents on the silicon atoms in the siloxane diacid may be alkyl, aryl, alkylaryl or arylalkyl radicals containing up to 10 carbon atoms. Although the lower alkyl radicals are generally preferred, those compounds wherein R' and R" are phenyl groups have been found to have physical characteristics which make them ideally suited for use as synthetic lubricants. Furthermore the groups designated R' and R" may be mixed aliphatic and aromatic radicals.

To prepare the new compounds of the present invention, the dicarboxylic siloxane acid used is esterified with an organic diol in a molar ratio of acid to diol of 1.33:1 to 2:1. Limitation or chain termination of the polyesters is accomplished by esterifying the intermediate product of the acid-diol reaction with a monoalcohol which is added in at least a stoichiometric quantity and preferably in slight molar excess of from 5% to 10% to insure chain termination. The esterification reaction is generally carried out by refluxing the reactants in a flask or vessel equipped with a reflux condenser and a water trap; the latter providing a means for removing water-of-esterification from the reaction zone. The removal of water is accomplished by using an azeotrope-forming solvent such as toluene, benzene, xylene or the like. Depending upon the quantity of reactants used, esterification can be completed in from 1 to 6 hours when reflux is carried out at a temperature of between 80° C. and 120° C. Reflux temperature is determined by the particular solvent used to form the azeotrope. An acid catalyst may be used to improve the esterification reaction rate; suitable for this purpose are sulphuric acid, phosphoric acid, paratoluene sulfonic acid, hydrogen chloride, thionyl chloride, acetyl chloride, boron trifluoride, and trifluoroacetic acid.

In carrying out the reaction, the acid and the diol are first esterified in the presence of the solvent and a small amount of acid catalyst. Refluxing is carried out until the theoretical amount of water-of-esterification is recovered in the water trap. This amount of water depends upon the molar quantity of reactants used. After recovery of this amount of water, a slight molar excess of the monoalcohol is added to the reaction mixture and refluxing is again carried out until the theoretical amount of water is recovered upon completion of this second esterification reaction. The reaction mixture is cooled, washed with water, washed with sodium carbonate solution and again washed with water to remove any unreacted acid present. The solvent and excess monoalcohol are removed from the reaction mixture by distillation at a reduced pressure.

The monoalcohols used in the preparation of the polyesters of this invention have a carbon chain length of from 2 to 12 carbon atoms. Typical of such alcohols are ethanol,
isopropanol,
pentanol,
2-ethylhexanol,
heptanol, 2-methylnonanol,
dodecanol,
1,1-dihydroperfluoropentanol,
1,1,5-trihydroperfluoropentanol,
5,5-difluoropentanol,
1,1-dihydroperfluorohexanol,
1,1,6-trihydroperfluorohexanol,
1,1-dihydroperfluoroheptanol,
1,1,7-trihydroperfluoroheptanol,
1,1-dihydroperfluorooctanol,
1,1,3-trihydroperfluorooctanol,
1,1,8,8-tetrahydroperfluorooctanol,
1,1-dihydroperfluororononanol,
1,1-dihydroperfluorododecanol,
1,1-dihydroperchloropropanol,
perchloroethanol,
1,1-dihydroperchlorohexanol,
1,1-dihydro-3,4-dichloroperfluorodecanol,
1,1-dihydro-3,4-dichloroperfluorobutanol,
1,1-dihydro-3,5,6, trichloroperfluorohexanol,
1,1-dihydro-3,5,7,8-tetrachloroperfluorooctanol,
1,1-dihydro-3,5,7,9,10-pentachloroperfluorodecanol,
1,1-dihydro-3,5,7,9,11,12-hexachloroperfluorododecanol,
1,1-dihydro-3,5,7,9,11,13,14-heptachloroperfluorododecanol,
2-fluoroethanol,
1,1-dihydroperfluoroethanol,
1,1,2-trihydroperfluoroethanol,
1,1-dihydroperfluoropropanol,
1,1,3-trihydroperfluoropropanol,
1,1,2,2-tetra-hydroperfluorobutanol,
1,1-dihydroperfluorobutanol,
1,1-dihydroperchlorooctanol,
1,1-dihydroperchlorononanol,
1,2-dihydroperchlorodecanol,
2-chloroethanol,
3-chloropropanol,
4-chlorobutanol,
10-chlorodecanol,
12-chlorododecanol,
1,3-dichloropropanol.

Some of the hydrocarbon dialcohols which may be employed in the preparation of the polyester of this invention are 1,2-ethanediol,
1,3-propanediol,
1,4-butanediol,
1,3-butanediol,
2,3-butanediol,
1,5-pentanediol,
1,4-pentanediol,
1,6-hexanediol,
1,7-heptanediol,
1,8-octanediol,
1,9-nonanediol,
1,10-decanediol,
1,11-undecanediol,
1,12-dodecanediol,
3-methyl-1,5-pentanediol,
2-ethyl-2-butyl-1,3-propanediol,
2,2-diethyl-1,3-propanediol.

Some of the ether dialcohols are diethylene glycol, triethylene glycol, dipropylene glycol, tetraethylene glycol, and tetrapropylene glycol.

Chlorinated and fluorinated dialcohols which may be used include 1,2-difluoroethanediol-1,2,
1,1,3,3-tetrahydroperfluoropropanediol-1,3,
1,1,6,6-tetrahydroperfluorohexanediol-1,6,
1,1,7,7-tetrahydroperfluoroheptanediol-1,7,
1,1,8,8-tetrahydroperfluorooctanediol-1,8,
1,1,10,10-tetrahydroperfluorodecanediol-1,10,
1,1,4,4-tetrahydroperfluorobutanediol-1,4,
1,1-dihydroperchloropentanediol-1,5,
Perchlorohexanediol-1,6,
1,1-dihydroperchloroheptanediol-2,6,
1,2-dihydroperchlorooctanediol-2,7,
1,1-dihydroperchlorononanediol-1,9,
1,12-dihydroperchlorododecanediol-1,12,
2-chloropropanediol-1,3,
3-chloropropanediol-1,2,
2-chloropentanediol-1,5,
3-chloropentanediol-1,5,
3,4-dichlorohexanediol-1,6,
4-chlorooctanediol-1,8 and
perfluorohexanediol-1,6.

Examples of the fluorochlorinated dialcohols which may be used in the practice of this invention are 1-chloroperfluoroethanediol-1,2,
3,5-dichloroperfluorohexanediol-1,6,
1,1-dihydro-2,4,6-trichloroperfluorooctanediol-1,8,
5,5-difluoroperchlorononanediol-1,9,
1,1-dihydro-2,6-difluoroperchlorododecanediol-1,12,
2-fluoro-3-chlorobutanediol-1,4,
2-chloro-3-fluorobutanediol-1,4,
2-chloro-2-fluorobutanediol-1,4,
3-chloro-3-fluorobutanediol-1,4.

The following examples illustrate the method of preparation of the polyesters of this invention.

EXAMPLE 1

To a 500 ml. three-neck, round-bottom flask provided with a mechanical stirrer, a reflux condenser fitted with a water trap and a thermometer 69.5 gm. (0.25 mol) of 4,4,6,6 - tetramethyl-4,6-disila-5-oxanonanedioic acid is added. To this acid 11.25 gm. (0.125 mol) of 1,4-butanediol is added together with 1 gm. of concentrated sulfuric acid and 250 cc. of benzene. The reactants are mixed and refluxed at a temperature of about 75° for a period of 6 hours. At that time approximately 4.5 cc. of water representing the theoretical amount of water of esterification had been recovered from the reaction zone. After esterification of the acid and diol was substantially completed 36 gm. (0.288 mol) of 1,1,3-trihydroperfluoropropanol is added to the reaction zone and reflux again conducted. An additional 4.5 gms. of water is recovered. Unreacted alcohol and solvent are removed from the reaction zone by distillation at atmospheric pressure. The crude ester product remaining, after removal of solvent and alcohol, is washed with water, washed with 10% sodium carbonate and again washed with water to remove unreacted acid and catalyst. The final product is recovered by distillation at a reduced pressure of about 0.5 to 1.0 mm. Hg. This product will analyze as follows:

CHEMICAL FORMULA—$C_{30}H_{54}O_{10}F_8Si_4$

| | |
|---|---|
| Mol. wt. | 838 |
| Percent Si theo | 13.4 |
| Percent Si found | 13.9 |
| Vis. @ 100° F., cs. | 22.88 |
| Vis. @ 200° F., cs. | 4.65 |
| V.I. | 137 |
| Pour point, °F. | −45 |

EXAMPLE 2

To 37.8 g. (.135 mol) of 4,4,6,6-tetramethyl-4,6-disila-5-oxanonanedioic acid, and 4.2 g. (.068 mol) ethylene glycol are added together with 0.3 g. of p-toluene sulfonic acid and 135.0 g. of toluene. The acid glycol reaction mixture is then heated under reflux in a 500 ml., three-neck, round bottom flask provided with a mechanical stirrer, a reflux condenser fitted with a water trap, and a thermometer. The reaction mixture was heated until the theoretical amount of water esterification (2.4 g.) was removed from the reaction zone by means of the water trap. This was accomplished by maintaining a reflux temperature of from 84° C. to 100° C.

After the acid-diol esterification reaction is substantially complete 66 g. (.136 mol) of 1,1-dihydro-3,5,7,8-tetrachloroperfluorooctanol is added to the reaction mixture and reflux carried out until the theoretical amount of water is recovered. The reaction mixture was then cooled, washed with water, washed with 10% sodium carbonate solution, and again washed with water. Excess solvent and alcohol were then removed from the reaction zone by distillation at reduced pressure. The residue was an oil having the following characteristics:

| | |
|---|---|
| Vis. @ 100° F., cs. | 142.6 |
| Vis. @ 210° F., cs. | 15.0 |
| V.I. | 112 |
| Pour point, ° F. | −65 |
| Percent Si theo | 7.4 |
| Percent Si found | 8.0 |
| Mol. wt. (calc.) | 1514 |
| Flash pt., ° F. | 350 |

EXAMPLE 3

To 56.0 gm. (0.2 mol) of 4,4,6,6-tetramethyl-4,6-disila-5-oxanonanedioic acid, 21.2 gm. (0.1 mol) of 1,1,5,5-tetrahydroperfluoropentanediol-1,5 is added in the apparatus described in Example 1. 250 cc. of toluene and 1 gm. of concentrated sulfuric acid is added to the reaction zone and esterification is carried out according to the method set forth in Example 1. After esterification is substantially complete as indicated by recovering the theoretical amount of the water of esterification, 18.3 gm. (0.2 mol) of 5-chloroamyl alcohol is added and reflux again conducted until esterification is substantially complete. The product will be recovered in the manner described in Example 1.

EXAMPLE 4

To 55.6 gm. (0.2 mol) of 4,4,6,6-tetramethyl-4,6-disila-5-oxanonanedioic acid, 10.4 gm. (0.1 mol) of 1,5 pentanediol was added, together with .5 gm. of p-toluene sulfonic acid and 200 ml. of toluene. The acid-diol mixture was then refluxed at a temperature of from 85 to 100° C. for approximately 6 hours. After approximately 3.6 gms. of water was collected, indicating substantially complete esterification of the acid, 70.0 gms. (0.2 mols) of 1,1 dihydro-3,5,6-trichloroperfluorohexanol was added. The mixture was again refluxed until the theoretical amount of water was recovered. The reaction mixture was cooled, washed with water, washed with 10% sodium carbonate solution, and washed again with water. Toluene and chain stopping alcohol were removed from the reaction zone by distillation at reduced pressure. The product recovered analyzed as follows:

| | |
|---|---|
| Vis. @ 100° F., cs. | 64.5 |
| Vis. @ 210° F., cs. | 9.4 |
| V.I. | 127 |
| Pour point, ° F. | <−65 |
| Percent Si theo | 8.7 |
| Percent Si found | 8.0 |
| Mol. wt. (calc.) | 1288 |
| Flash pt., ° F. | >350 |

EXAMPLE 5

Following the procedure set forth in the foregoing examples, 27.8 gm. (0.1 mol) of 4,4,6,6-tetramethyl-4,6-disila-5-oxanonanedioic acid is reacted with 10.6 gm. (0.05 mol) of 1,1,5,5-tetrahydroperfluoropentanediol-1,5, in the presence of 1 gm. $H_2SO_4$ and 250 cc. toluene. Chain termination is accomplished by adding to the reaction zone after initial esterification 23.2 gm. (0.10 mol) of 1,1,5 trihydroperfluoropentanol. The product is recovered as previously described and will have the following properties and characteristics:

CHEMICAL FORMULA—$C_{35}H_{50}O_{10}F_{22}Si_4$

| | |
|---|---|
| Mol. wt. | 1160 |
| Percent Si theo | 9.65 |
| Percent Si found | 9.40 |
| Percent F., theo | 35.51 |
| Percent F., found | 35.9 |
| Vis. @ 100° F., cs. | 44.96 |
| Vis. @ 200° F., cs. | 7.95 |
| V.I. | 141 |
| Pour point, ° F. | −70 |

EXAMPLE 6

Following the method set forth in Example 1, 41.7 gm. (0.15 mol) of 4,4,6,6-tetramethyl-4,6-disila-5-oxanonanedioic acid is reacted with 9.0 gm. (0.10 mol) of butanediol-1,4 in the presence of 0.3 g. of p-toluene sulfonic acid and 135 ml. toluene. After reflux and recovery of the theoretical amount of water of esterification, 46.6 g. of $Cl(CF_2CFCl)_3CF_2CH_2OH$ (0.1 mol) is added to the reaction mixture and reflux again continued until esterification is complete. The product is then washed with water, washed with a dilute alkaline solution and again washed with water. The product is recovered by distilling off excess solvent and alcohol at a reduced pressure.

EXAMPLE 7

As set forth in the previous examples, 70.4 gm. (0.2 mol) of 4,4,6,6,8,8-hexamethyl-4,6,8-trisila-5,7-dioxaundecandioic acid is reacted with 9.0 gm. (0.1 mol) of 1,4-butanediol in the presence of 1 gm. $H_2SO_4$ and 250 cc. of benzene. Chain termination is accomplished by adding to the product of the initial esterification 26.4 gm. (0.2 mol) of 1,1,3-trihydroperfluoropropanol. The polyester product will be recovered according to the method described in the foregoing examples.

EXAMPLE 8

In a manner similar to that set forth in Examples 1 and 2 above, 37.0 g. (0.133 mol) of 4,4,6,6-tetramethyl-4,6-disila-5-oxanonanedioic acid, is reacted with 11.8 g. (0.10 mol) 1,6-hexanediol in the presence of .3 g. p-toluene sulfonic acid and 135 g. of toluene. After completion of the acid diol esterification reaction, chain length of the polyester is terminated by refluxing with the ester product 31 g. (0.067 mol) of $$Cl(CF_2—CFCl)_3CF_2CH_2OH.$$

The final product is recovered in the manner described in the foregoing examples.

EXAMPLE 9

To 56.0 gm. (0.2 mol) of 4,4,6,6-tetramethyl-4,6-disila-5-oxanonanedioic acid 16.2 gm. (0.1 mol) of 1,1,4,4-tetrahydroperfluorobutanediol-1,4 is added. These reactants are refluxed in the presence of 1 gm. $H_2SO_4$ and 250 cc. of toluene. Upon completion of the esterification reaction 29.2 gm. (0.2 mol) of 2-fluoro-2-ethylhexanol is added to the reaction mixture. Reflux is again carried out and a final product recovered according to the method of Example 1.

EXAMPLE 10

38.0 g. (.136 mol) of 4,4,6,6-tetramethyl-4,6-disila-5-oxanonanedioic acid is reacted with 6.1 g. (.068 mol) of butanediol-1,4 in the presence of 0.3 of p-toluene sulfonic acid and 135 g. toluene. Termination of the ester chain of the product resulting from the reaction of the foregoing materials is accomplished by adding to the reaction zone 47.5 g. (0.136 mol) of $Cl(CF_2CFCl)_2CF_2CH_2OH$.

EXAMPLE 11

Following the method described in Example 1, 56.0 gm. (0.2 mol) of 4,4,6,6-tetramethyl-4,6-disila-5-oxanonanediodic acid is esterified with 21.2 gm. (0.1 mol) of 1,1,5,5-tetrahydroperfluoropentanediol-1,5 in the presence of 1 gm. $H_2SO_4$ and 250 cc. toluene. Chain length is terminated by adding to the intermediate ester product 46.4 gm. (0.2 mol) of 1,1,5-trihydroperfluoropentanol. Product recovery is carried out as described in Example 1.

EXAMPLE 12

Following the procedure outlined in the foregoing examples, 73.2 g. (.10 mol) of 7,7,9,9,11,11,13,13,15,15,17,17,19,19 - tetradecamethyl - 7,9,11,13,15,17,19 - heptasila-8,10,12,14,16,18-hexaoxapentacosanedioic acid and 5.3 g.

(.05 mol) of diethylene glycol are refluxed together in the presence of 0.2 g. of p-toluene sulfonic acid (catalyst) and 100 cc. of toluene.

The ester product resulting is limited in chain length by the addition of 23.3 g. (.05 mol) of the chlorofluoro- alcohol, 1,1-dihydro-3,5,7,8 tetrachloroperfluorooctanol, to the reaction mixture with further reflux being conducted until the theoretical amount of water is recovered.

EXAMPLE 13

To 56.0 gm. (0.2 mol) of 4,4,6,6-tetramethyl-4,6-disila-5-oxanonanedioic acid 16.2 gm. (0.1 mol) of 1,1,4,4-tetrahydroperfluorobutanediol-1,4 is added, together with 1 gm. conc. H$_2$SO$_4$ and 250 cc. toluene. The reactants are refluxed under esterification conditions to provide an intermediate product which is further reacted with 66.4 gm. (0.2 mol) of 1,1,7-trihydroperfluoroheptanol. The product recovered according to the method of Example 1 will have the following structure:

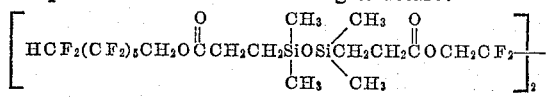

EXAMPLE 14

Following the procedure outlined in the foregoing examples, 27.8 g. (.10 mol) 4,4,6,6-tetramethyl-4,6-disila-5-oxanonanedioic acid and 5.3 g. (.50 mol) diethylene glycol are reflected together in the presence of 0.2 g. p-toluene sulfonic acid (catalyst) and 100 cc. toluene.

The ester product resulting is limited in chain length by the addition of 23.3 g. (.05 mol) of 1,1-dihydro-3,5,7,8-tetrachloroperfluorooctanol to the reaction mixture with further reflux being conducted until the theoretical amount of water is recovered.

EXAMPLE 15

56.0 gm. (0.2 mol) of 4,4,6,6-tetramethyl-4,6-disila-5-oxanonanedioic acid is reacted with 10.4 (0.1 mol) of 1,5 pentanediol under esterification conditions in the presence of 1 gm. conc. H$_2$SO$_4$ and 250 cc. toluene. The resulting polyester product is further reacted with 66.4 gm. (0.2 mol) of 1,1,7-trihydroperfluoroheptanol, to provide a final product having the following structure:

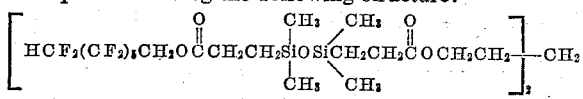

EXAMPLE 16

Following the procedure outlined in the foregoing examples, 27.8 g. (.10 mol) 4,4,6,6-tetramethyl-4,6-disila-5-oxanonanedioic acid and 5.3 g. (.05 mol) diethylene glycol are refluxed together in the presence of 0.2 g. p-toluene sulfonic acid (catalyst) and 100 cc. toluene.

The ester product resulting is limited in chain length by the addition of 29.1 g. (.05 mol) 1,1-dihydro-3,5,7,9,10-pentachloroperfluorodecanol to the reaction mixture with further reflux being conducted until the theoretical amount of water is recovered.

EXAMPLE 17

In the manner previously described 41.7 gm. (0.15 mol) of 4,4,6,6-tetramethyl-4,6-disila-5-oxanonanedioic acid is esterified with 9.0 gm. (0.10 mol) of 2,3-butanediol in the presence of 1 gm. conc. H$_2$SO$_4$ and 250 cc. toluene. The intermediate product is further esterified with 13.2 gm. (0.10 mol) of 1,1,3-trihydroperfluorophopanol. The final product recovery is accomplished according to the method of Example 1 and has the following structure:

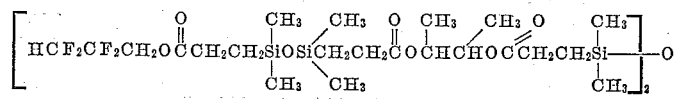

EXAMPLE 18

Following the procedure outlined in the foregoing examples, 27.8 g. (.10 mol) 4,4,6,6-tetramethyl-4,6-disila,-5-oxanonanedioic acid and 5.9 g. (.05 mol) 1,6-hexanediol, are refluxed together in the presence of 0.2 g. p-toluene sulfonic acid (catalyst) and 100 cc. toluene.

The ester product resulting is limited in chain length by the addition of 17.5 g. (.05 mol) 1,1-dihydro-3,5,6-trichloroperfluorohexanol to the reaction mixture with further reflux being conducted until the theoretical amount of water is recovered.

EXAMPLE 19

37.0 gm. (0.133 mol) of 4,4,6,6-tetramethyl-4,6-disila-5-oxanonanedioic acid is esterified with 21.2 gm. (0.10 mol) of 1,1,5,5-tetrahydroperfluoropentanediol-1,5 in the presence of 1 gm. conc. H$_2$SO$_4$ and 250 cc. toluene. The intermediate product is refluxed with 8.2 gm. (0.067 mol) of 5-chloro-amyl alcohol to yield a final polyester having the following structure:

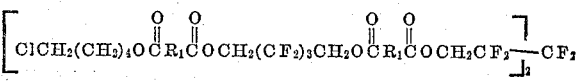

where

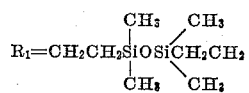

EXAMPLE 20

According to the previously described method 67.4 gm. (0.10 mol) of 4,4,10,10-tetramethyl-6,6,8,8-tetraphenyl-4,6,8,10-tetrasila-5,7,9-trioxatridecanedioic acid is reacted with 4.5 gm. (0.05 mol) of 1,4-butanediol. The polyester product resulting is terminated by reacting the intermediate product with 13.2 g. (0.10 mol) of 1,1,3-trihydroperfluoropropanol. The distillation of the final product yields a fluorinated polyester having the following structure:

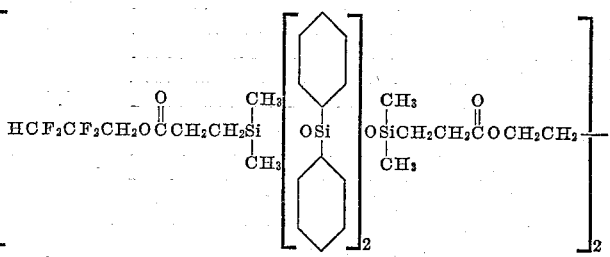

EXAMPLE 21

To a 500 ml. three-neck, round-bottom flask provided with a mechanical stirrer, a reflux condenser fitted with a water trap and a thermometer, 69.5 gm. (0.25 mol) of 4,4,6,6-tetramethyl-4,6-disila-5-oxanonanedioic acid is added. 15.4 gm. (0.125 mol) of 2-chloropropanediol-1,3 is added together with 1 gm. of concentrated sulfuric acid and 250 cc. of benzene. The reactants are mixed for 6 hours at 75° C. At the expiration of this period, 4.5 cc. of water had been recovered in the water trap. The reaction product is further treated with 85.0 gm. (0.26 mol) of 1,1,7-trihydroperfluoroheptanol and reflux continued. When 4.5 cc. of water had again been collected in the water trap, unreacted alcohol and solvent is removed by distillation. The crude ester remaining is washed with water, washed with 10% sodium carbonate and again washed with water to remove unreacted acid and catalyst. The final product is recovered under reduced pressure and is of the formula:

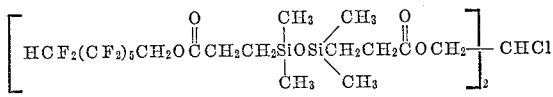

EXAMPLE 22

According to the procedures already described herein, 69.5 gm. (0.25 mol) of 4,4,6,6-tetramethyl-4,6-disila-5-oxanonanedioic acid is reacted with 17.7 gm. (0.125 mol) of 2-fluoro-3-chloro-1,4-butanediol. The reactants are heated to reflux temperature until 4.5 cc. of water is recovered in the water trap. At this time, 120.4 gm. (0.28 mol) of 1,1,9-trihydroperfluorononanol is added to the reaction mixture and the temperature is raised to reflux temperature. When the second esterification reaction is complete, the product is recovered as described hereinbefore.

EXAMPLE 23

Into the apparatus, described in Example 1, are placed 69.5 gm. (0.25 mol) of 4,4,6,6-tetramethyl-4,6-disila-5-oxanonanedioic acid and 15.4 gm. (0.125 mol) of 3-chloropropanediol-1,2 and the mixture is heated to reflux temperature. When the theoretical amount of water is recovered in the water trap, 80.3 gm. (0.275 mol) of 10-chlorodecanol is added and the mixture is again refluxed until 4.5 cc. of water are recovered. The final product is recovered as described. The resulting polyester is of the formula

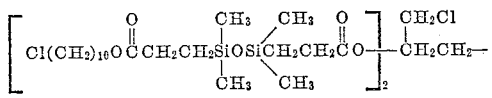

EXAMPLE 24

According to the procedures already described, 88.0 gm. (0.25 mol) of 4,4,6,6,8,8-hexamethyl-4,6,8-trisila-5,7-dioxaundecandioic acid is reacted with 44.2 gm. (0.125 mol) of 3-chloropentanediol-1,5. The product of this first reaction is then reacted with 123 gm. (0.28 mol) of 1,1-dihydro-3,5,7,8-tetrachloroperfluorooctanol and the final product recovered as in Example 1.

EXAMPLE 25

In accordance with the procedure of Example 1, 139.0 gm. (0.5 mol) of 4,4,6,6-tetramethyl-4,6-disila-5-oxanonanedioic acid is reacted with 35.5 gm. (0.25 mol) of 2-fluoro-3-chlorobutanediol-1,4. After the theoretical amount of water-of-esterification is recovered, 177.4 gm. (0.51 mol) of 1,1-dihydro-3,5,6-trichloroperfluorohexanol is added to the mixture. The final product is recovered as described previously.

EXAMPLE 26

Into the apparatus described in Example 1, 69.5 gm. (0.25 mol) of 4,4,6,6-tetramethyl-4,6-disila-5-oxanonanedioic acid and 17.7 gm. (0.125 mol) of 2-fluoro-3-chlorobutanediol-1,4 are added. The mixture is heated to reflux temperature and refluxed for 6 hours. At the expiration of this time, 4.5 cc. of water are recovered in the water trap. At this time, 29.7 gm. (0.27 mol) of 1,3-dichloropropaneol-2 are added to the mix and refluxing continued. When an additional 4.5 cc. of water are recovered in the trap, heating is discontinued and the product recovered in accordance with the procedure of Example 1.

EXAMPLE 27

Into a 1000 ml. round-bottom, three-necked flask equipped with a stirrer, a thermometer and a reflux condenser fitted with a water trap, 278.0 gm. (1 mol) of 4,4,6,6-tetramethyl-4,6-disilia-5-oxanonedioic acid are placed. 55.0 gm. (0.5 mol) of 3-chloropropanediol are added together with 1 gm. of concentrated sulfuric acid and 250 cc. of benzene. The mixture is then refluxed until 18 cc. of water are recovered in the water trap. The reaction product is further treated with 51.1 gm. (1.1 mol) of ethanol and the mixture again brought to reflux temperature until the theoretical amount of water-of-esterification is again recovered in the water trap. The polyester is recovered as described previously. The polyester product is of the formula

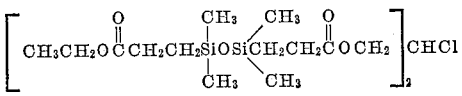

EXAMPLE 28

Into the apparatus described in Example 27, 278 gm. (1 mol) of 4,4,6,6-tetramethyl-4,6-disilia-5-oxanonanedioic acid and 47.0 gm. (0.5 mol) of 3-fluoropropanediol together with 4 gm. of sulfuric acid and 500 cc. of benzene are placed and the mixture brought to reflux temperature. Refluxing is continued until 18 cc. of water-of-esterification are caught in the water trap. At this time, 147.4 gm. (1.1 mol) 5-ethylhexanol are added and the mixture again brought to reflux temperature. The final product is recovered as previously described and is of the formula

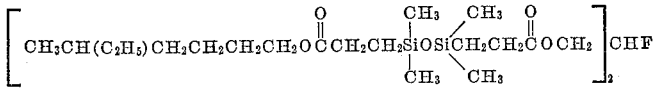

EXAMPLE 29

Into the apparatus described in Example 27 are placed 139.0 (0.5 mol) of 4,4,6,6-tetramethyl-4,6-disilia-5-oxanonanedioic acid and 49.5 gm. (0.375 mol) of 1-chloroperfluoroethanediol-1,2 along with 2 gm. of concentrated sulfuric and 500 cc. of o-xylene. The mixture is brought to reflux temperature and refluxed until the theoretical amount of water is recovered in the water trap. 46.5 (0.25 mol) of dodecanol are added and refluxing resumed. When 4.5 cc. of water-of-esterification are recovered in the water trap, heating is discontinued and the product is washed and recovered as described previously. The product is of the formula

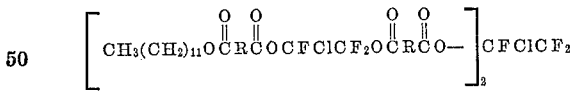

wherein

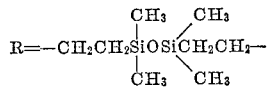

The polyesters of the present invention, as is readily apparent from the foregoing examples, can be prepared with considerable variation in ultimate structure. The ability to produce these compounds with varying structure provides a substantial advantage in their utilization. The varying molecular weights and structures available with the new polyesters of the present invention make them suitable for a wide variety of uses including use as synthetic lubricants, hydraulic fluids, automatic transmission fluids, emulsifiers, plasticizers, elastomers and other similar uses.

When a particular hydraulic fluid or lubricant specification is to be met, the particular polyester selected must possess characteristics and properties particularly adapted to perform the function desired. The polyesters of the present invention, it has been found, are particularly suitable as synthetic lubricants. For this purpose, a wide variety of compounds within the broad definition of the subject compounds may be used. For example, those compounds which contain only fluorine in the dialcohol and monoalcohol portions are quite satisfactory for certain lubricant purposes. However, it has been found that those compounds prepared with both fluorine and chlorine in these alcohol portions possess lubricant characteristics far superior to the fully chlorinated or fully fluorinated compounds. The relative effectiveness of these compounds as lubricants was determined by subjecting them to the Shell 4-ball test.

This test involves apparatus composed of 3 rigidly held ½" metal balls (type 52–100 steel) submerged in a metal cup containing the lubricant to be tested. A rotating 4th ball of the same size and composition is brought into contact with the stationary balls and allowed to rub for a fixed period at a fixed rotation rate. Weights of increasing size are applied to the 4th ball to determine the load carrying characteristics of the tested lubricant. As wear progresses, circular scars begin to appear at the point of contact. At the expiration of the test period, the apparatus is dismantled and the balls examined. The average diameter of these circular scars expressed in millimeters is taken as a measure of wear. The temperature at which the test is conducted may vary from 0° C. to 170° C.

The compound of Example 1 was tested on this apparatus at 70° C. for two hours at a speed of 600 r.p.m. For comparative purposes, tests on two other commercially available lubricants were also run under the same conditions. The first one, Commercial A, is a polysiloxane, synthetic lubricant having a chain length and molecular weight substantially similar to the compounds of this invention. "100 Neutral Mineral Oil" is a conventional hydrocarbon lubricating oil having an SUS of 100. Table I shows the results of these tests.

*Table I*

[Wear characteristics of lubricants at 70° C, 600 r.p.m. for two hours]

| Load | Commercial A | 100 Neutral Mineral Oil | Product of Example 1 |
|---|---|---|---|
| 1 kg | 0.82 | 0.26 | 0.31 |
| 5 kg |  | 0.38 | 0.27 |
| 10 kg |  | 0.75 | 0.36 |
| 20 kg |  | 0.86 | 0.34 |

To determine the extreme pressure characteristics of these three lubricants, the operating conditions of the 4-ball test were changed to 1800 r.p.m. for 3 seconds at 70° C. Much heavier weights were added under these conditions. Table II shows the results obtained.

*Table II*

| Load | Commercial A | 100 Neutral Mineral Oil | Product of Example 1 |
|---|---|---|---|
| 40 kg | 0.65 | 0.36 |  |
| 60 kg | 1.12 | 1.86 | 0.38 |
| 80 kg | 1.84 | 2.1 | 0.39 |
| 100 kg | 2.6 |  | 0.49 |
| 120 kg | 2.6 |  | 0.51 |
| 140 kg |  |  | 2.0 |

As will be readily apparent from an examination of these tables, the fluorine-containing compounds within the scope of this invention show improved lubricating properties under wear and extreme pressure conditions.

The polyesters of this invention which contain chlorine, such as the products of Examples 21 and 22, have high fire points and high viscosity indices which make them ideally suited for use as hydraulic fluids and automatic transmission fluids. These compounds may also be used as synthetic lubricants. When so employed, conventional anti-oxidant additives may also be included in the final composition; some of the additives generally recommended are phenothiazine, di-tertiarybutyl-p-cresol, phenylnaphthylamine, 5-ethyl-10,10-diphenylphenazasiline.

It has been found that these compounds within the scope of this invention which contain both fluorine and chlorine have greatly improved lubricant and extreme pressure characteristics. The product of Example 2, along with Commercial A and 100 neutral oil, were treated on the Shell 4-ball apparatus to determine the "seizure load" of these compounds. The seizure load is that load at which the average scar diameter of the balls expressed in millimeters exceeds 1.0. It is considered that at this and higher loads, the lubricant can no longer properly prevent metal-to-metal contact and the lubricant capacity of the compound tested has been exceeded. The results of tests run on these compounds appear in Table III.

*Table III*

| Compounds | Seizure Load (@ 1,800 r.p.m., 3 seconds 70° C.) |
|---|---|
|  | Kg. |
| "100 neutral oil" | 55 |
| "Comm. A" | 50 |
| Example 2 | 170 |

These results are extremely significant in that they indicate that the fluorochloro compounds when used as lubricants can perform suitably up to pressures more than three times the useful limit of commercially available lubricants.

In addition, the fluorochloro compounds prepared within the molecular weight range available according to the generic formula described meet the government Gas Turbine Aircraft Specification Mil–L–7808 B.

MIL–L–7808 B SPECIFICATION

| | |
|---|---|
| Viscosity @ 210° F., centistokes _____ min__ | 3.0 |
| Viscosity @ –65° F., centistokes _____ max__ | 13,000 |
| Pour point, F. _____ max__ | –75 |
| Flash point, F. _____ min__ | 400 |
| Evap. loss percent @ 400° F. _____ max__ | 35 |
| Ryder gear scuff load, lbs./in. _____ min__ | 1870 |

It will be noted that the product of Examples 2 and 4 satisfy the foregoing specification.

The new compounds of the present invention may also be used as extreme pressure additives for mineral oil compositions and may be admixed with distillate derived from paraffinic, naphthanic, asphaltic or mixed base crudes. Blended mineral oil compositions utilizing the new compounds of the present invention may also include various additives, such as anti-oxidants, pour point depressants, thickeners, soaps, dyes and the like as required by the particular use for which the composition is intended.

The foregoing examples and illustrations are included in this specification for explanatory purposes alone and it is intended that the scope of this invention be limited solely by the claims appended hereto.

We claim:

1. As a composition of matter, the polyester

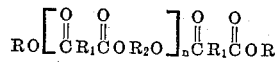

wherein R is a monovalent alkyl radical selected from the group consisting of hydrocarbon, fluorinated, chlorinated and fluorochlorinated radicals of from 2 to 12 carbon atoms; $R_1$ is the divalent radical

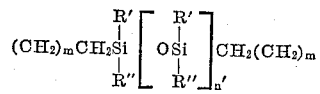

wherein R' and R" are hydrocarbon radicals of from 1 to 10 carbon atoms, m is an integer from 1 to 8 and n' is an integer from 1 to 8; $R_2$ is a divalent alkylene radical selected from the group consisting of hydrocarbon, fluorinated, chlorinated and ether radicals of from 2 to 12 carbon atoms provided that R₂ is not a hydrocarbon and is not an ether radical when R is a hydrocarbon; and $n$ is an integer from 1 to 4.

2. The polyester

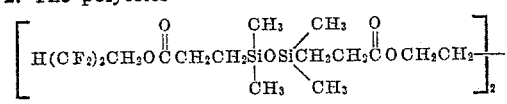

3. The polyester

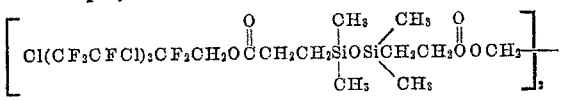

4. The polyester

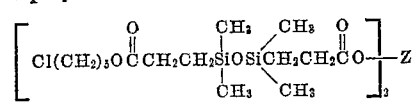

wherein Z is the divalent radical —CH₂(CF₂)₃CH₂—.

5. The polyester

6. The polyester wherein Z is the divalent radical —CH₂(CF₂)₃CH₂—

7. The polyester

8. The polyester

9. The polyester

10. The polyester

11. The polyester

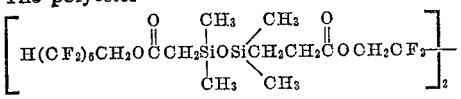

12. The polyester

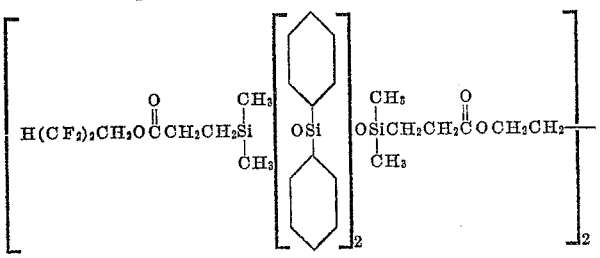

13. The polyester

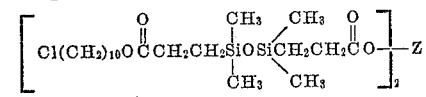

wherein Z is the divalent radical

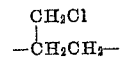

14. The polyester

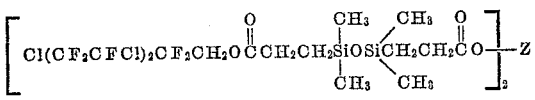

wherein Z is the divalent radical —CH₂CHFCHClCH₂—.

15. The polyester

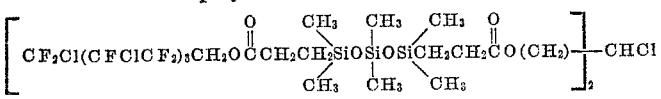

16. The polyester

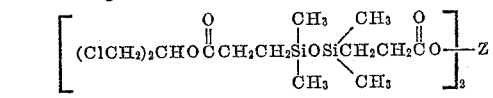

wherein Z is the divalent radical —CH₂CHFCHClCH₂—.

17. The polyester

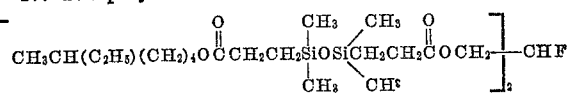

18. The polyester

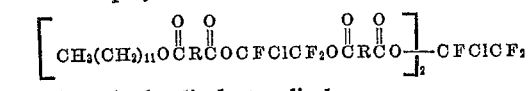

wherein R is the divalent radical

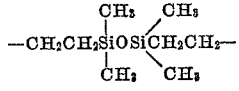

References Cited in the file of this patent
UNITED STATES PATENTS
2,916,507    Kerschner et al. _____ Dec. 8, 1959